US009734187B2

(12) United States Patent
Fuchs

(10) Patent No.: US 9,734,187 B2
(45) Date of Patent: Aug. 15, 2017

(54) ATOMIC TRANSACTIONS IN A NOSQL DATABASE

(71) Applicant: salesforce.com, inc., San Francisco, CA (US)

(72) Inventor: Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 320 days.

(21) Appl. No.: 14/217,737

(22) Filed: Mar. 18, 2014

(65) Prior Publication Data

US 2014/0304245 A1   Oct. 9, 2014

Related U.S. Application Data

(60) Provisional application No. 61/807,874, filed on Apr. 3, 2013.

(51) Int. Cl.
*G06F 7/00* (2006.01)
*G06F 17/30* (2006.01)

(52) U.S. Cl.
CPC .. *G06F 17/30371* (2013.01); *G06F 17/30227* (2013.01); *G06F 17/30377* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

*Primary Examiner* — Uyen Le
(74) *Attorney, Agent, or Firm* — Dergosits & Noah LLP; Todd A. Noah

(57) ABSTRACT

Systems and methods are provided for atomic transactions in a NoSQL database. A system writes a pending transaction identifier to write claim data for a first data item in a NoSQL database in response to a determination that the write claim data for the first data item includes a first previous transaction identifier included in last commit data for the first data item. The system writes the pending transaction identifier and a pending commit identifier to the last commit data for the first data item. The system writes a first value associated with a pending transaction to the first data item. The system aborts the pending transaction in response to a determination that the write claim data for the first data item does not include the first previous transaction identifier included in the last commit data for the first data item.

20 Claims, 3 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 8,010,663 B2 | 8/2011 | Firminger et al. |
| 8,015,495 B2 | 9/2011 | Achacoso et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 8,484,111 B2 | 7/2013 | Frankland et al. |
| 8,984,170 B2 * | 3/2015 | Colrain ............... H04L 67/146 707/703 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2010/0114830 A1 * | 5/2010 | Vanhove ............ G06F 17/30371 707/641 |
| 2011/0153566 A1 * | 6/2011 | Larson ............... G06F 17/30356 707/638 |
| 2012/0167098 A1 * | 6/2012 | Lee ................... G06F 17/30377 718/101 |
| 2013/0024484 A1 * | 1/2013 | Banerjee ............ G06F 17/30587 707/822 |
| 2014/0279987 A1 * | 9/2014 | Chico de Guzman Huerta ............... G06F 9/526 707/704 |

\* cited by examiner

100

| Data Items | Value 1 | Commit 1 | Value 2 | Commit 2 | Value 3 | Commit 3 | Last Commit | Write Claim |
|---|---|---|---|---|---|---|---|---|
| 101 | $900 | 111 | $850 | 112 | $1850 | 113 | 113, T123 | T123 |
| 102 | June 10 | 111 | June 20 | 112 | | | 112, T122 | T122 |
| 103 | ElectricBill | 111 | Credit Card | 112 | | | 112, T122 | T122 |

300

| Data Items | Value 3 | Commit 3 | Value 4 | Commit 4 | Value 5 | Commit 5 | Last Commit | Write Claim |
|---|---|---|---|---|---|---|---|---|
| 101 | $1850 | 113 | $1,700 | 114 | $1,625 | 115 | 115, T125 | T125 |
| 102 | | 113 | July 10 | 114 | July 20 | 115 | 115, T125 | T125 |
| 103 | | 113 | Electric Bill | 114 | Credit Card | 115 | 115, T125 | T125 |

ATOMIC TRANSACTIONS IN A NOSQL DATABASE

CLAIM OF PRIORITY

This application claims the benefit of U.S. Provisional Patent Application 61/807,874 entitled SYSTEM AND METHOD FOR LOCK-FREE OPTIMISTIC ATOMIC TRANSACTIONS, by Fuchs, filed Apr. 3, 2013, the entire contents of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Atomic Transactions in a NoSQL Database

One or more implementations relate generally to atomic transactions in a NoSQL database.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Some database systems may create errors due to offering concurrent access to multiple readers and writers. For a simple example used to illustrate concurrent access principles but not intended to describe real world practices, when a wife and a husband both access their joint checking account through different computers at the same time, their concurrent transactions may create errors. The wife's mobile phone and the husband's tablet computer each concurrently read their joint account balance as $1,000. When the wife's mobile phone processes her request to transfer $50 from a savings account to the joint checking account, the wife's mobile phone adds the $50 deposit to the previously read $1,000 balance to result in a new balance of $1,050, which the wife's mobile phone writes to the bank's database. When the husband's tablet computer processes his request to pay $50 electronically to a creditor, the husband's tablet computer subtracts the $50 payment from the previously read $1,000 balance to result in a new balance of $950, which the husband's tablet computer writes to the bank's database. Although the equal deposit and withdrawal of $50 should have resulted in the same balance of $1,000 that preceded these two transactions, the use of stale data in the second transaction resulted in a database system error.

Some database systems address such problems through pessimistic concurrency control, which temporarily locks subsequent access to a data item when the data item is initially accessed. For example, when the wife's mobile phone reads the data items for the joint checking account, the database system locks these data items, such that the access request made only one half second later by the husband's tablet computer is denied the access to read the joint checking account information. While this result may produce frustration for only the husband in this simplified example, database administrators of database systems with thousands of users may want to avoid using a locking algorithm that prevents read access for many users who may only be requesting to read data items. Consequently, pessimistic concurrency control can deliver poor performance because locking can drastically limit effective concurrency.

Therefore, some database system administrators use optimistic concurrency control, which assumes that multiple transactions can frequently complete without interfering with each other. Transactions access data items without acquiring locks on those data items. Before committing a write to a data item, a transaction verifies that no other transaction has modified the data item that the transaction is about to overwrite. If this verification reveals potentially conflicting modifications, the committing transaction rolls back and can be restarted. This safeguard for the data item is at the write cycle for optimistic concurrency control, which is much later in the transaction process than locking the data item at the read cycle for pessimistic concurrency control. Optimistic concurrency control is generally used in environments with low data contention. When conflicts are rare, transactions can complete without the expense of managing access locks and without having transactions wait for other transactions' access locks to clear, leading to higher throughput than pessimistic concurrency control. However, if contention for data items is frequent, the cost of repeatedly restarting transactions hurts performance significantly; such that pessimistic concurrency control may have better performance under these conditions.

In database systems with multiple readers and writers, there may be occasions when it is necessary to write multiple data items in an atomic fashion so that readers and writers do not have inconsistent views of underlying data. For example, the wife's mobile phone may request to pay $100 electronically from the joint checking account to an electric bill account on June $10^{th}$, which requires access to the three data items for the joint checking account balance, payee, and payment date. Continuing this example, the husband's tablet computer may request to pay $50 electronically from the joint checking account to a credit card bill account on June 20th, which requires access to the same three data items for the joint checking account balance, payee, and payment date.

For this example, a database system needs to allow atomic actions for all three of the data items, such that all three of the write requests from the wife's mobile phone are committed together and all three of the write requests from the husband's tablet computer are committed together. Committing only one write request from one computer for one data item and committing write requests out of order may risk the writing of inconsistent data. For example, committing only one of the multiple write requests for a transaction may result in paying the electric bill amount to the credit card account or paying the electric bill account late on the due date for the credit card bill. Some NoSQL database systems, such as HBase, currently allow atomic actions for a single row, thereby limiting the complexity of theses NoSQL database systems or forcing users to accept inconsistent data. Database system such as HBase store large quantities of sparse data.

BRIEF SUMMARY

In accordance with embodiments, there are provided systems and methods for atomic transactions in a NoSQL database. A system determines whether write claim data for a first data item in a NoSQL database includes a first previous transaction identifier included in last commit data for the first data item. For example, a database system determines whether the write claim data for a joint checking account balance includes the previous transaction identifier that is included in the last commit data for the joint checking account balance. The system writes a pending transaction identifier to the write claim data for the first data item in response to a determination that the write claim data for the first data item includes the first previous transaction identifier included in the last commit data for the first data item. For example, the database system writes the pending transaction identifier to the write claim data for the joint checking account balance because the write claim data for the joint checking account balance includes the previous transaction identifier that is included in the last commit data for the joint checking account balance.

The system writes the pending transaction identifier and a pending commit identifier to the last commit data for the first data item. For example, the database system writes the pending transaction identifier and the pending commit identifier to the last commit data for the joint checking account balance. The system writes a first value associated with a pending transaction to the first data item. For example, the database system writes a value to the joint checking account balance. The system aborts the pending transaction in response to a determination that the write claim data for the first data item does not include the first previous transaction identifier included in the last commit data for the first data item. For example, the database system aborts the pending transaction associated with the pending transaction identifier if the write claim data for the joint checking account balance does not include the previous transaction identifier that is included in the last commit data for the joint checking account balance. Accordingly, systems and methods are provided which enable a database system to provide atomic transactions in a NoSQL database.

While one or more implementations and techniques are described with reference to an embodiment in which atomic transactions in a NoSQL database is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for atomic transactions in a NoSQL database.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

A NoSQL database provides a mechanism for storage and retrieval of data that is modeled in means other than the tabular relations used in relational databases. Motivations for this approach include simplicity of design, horizontal scaling and finer control over availability. The NoSQL data structure differs from the data structure for relational database management systems, and therefore some operations are faster in NoSQL and other operations are faster in relational database management systems. The particular suitability of a given NoSQL database depends on the problem to be solved. Barriers to the greater adoption of NoSQL databases in practice include the lack of full atomic transaction support. In an atomic transaction, a series of database operations all occur, or nothing occurs and any other access to the system (such as from another transaction) either sees all the updates or none of the updates—never partially. A guarantee of atomicity prevents updates to a database occurring only partially, which can cause greater problems than rejecting the whole series of database operations outright. In other words, atomicity means indivisibility and irreducibility.

Figure 1:
FIG. 1 is a screen shot illustrating a portion of an example data table for atomic transactions in a NoSQL database in an embodiment.

FIG. 1 is a screen shot illustrating a portion of an example data table 100 for atomic transactions in a NoSQL database in an embodiment. Although the data table 100 depicts data items 101-103 listed in rows with different values, such as values for the last commit data and the write claim data, indicated in columns, the data table may depict the data items 101-103 in columns with different values, such as the values for the last commit data and the write claim data, indicated in rows. The last commit data and the write claim data may be stored in rows or columns, and may be referred to as a last commit family and a write claim family, respectively. Although the data table depicts commit identifiers 111, 112, and 113, and transaction identifiers T121, T122, and T123, as increasing integers, the commit identifiers and the transaction identifiers may be any sequence of identifiers that strictly increase or strictly decrease, such as a timestamp, to be able to determine which transaction is "later" in a sequence of transactions.

The database system stores the values in the data table 100 based on transactions identified by the transaction identifiers T121, T122, and T123, which resulted in the writing of the values by commits identified by the commit identifiers 111, 112, and 113. For example, the joint checking account balance began with $1,000, and a wife's mobile phone initiated a transaction identified by the transaction identifier T121 to pay $100 electronically to an electric bill account on June 10$^{th}$. The database system generated the commit identifier 111, wrote the value $900 to the data item 101 for the joint checking account balance, wrote the value June 10 to the data item 102 for the payment date, and wrote the value "Electric Bill" to the data item 103 for the payee, and also wrote the commit identifier 111 to the corresponding column for the data items 101-103.

Subsequently, a husband's tablet computer initiated a transaction identified by the transaction identifier T122 to pay $50 electronically to a credit card account on June 20$^{th}$. The database system generated the commit identifier 112, wrote the value $850 to the data item 101 for the joint checking account balance, wrote the value June 20 to the data item 102 for the payment date, and wrote the value "Credit Card" to the data item 103 for the payee, and also wrote the commit identifier 112 to the corresponding column for the data items 101-103. The wife's mobile phone initiated a transaction identified by the transaction identifier T123 to transfer $1,000 electronically from a savings account to the joint checking account. The database system generated the commit identifier 113, and wrote the value $1,850 to the data item 101 for the joint checking account balance, and also wrote the commit identifier 113 to the corresponding column for the data item 101.

Figure 2:
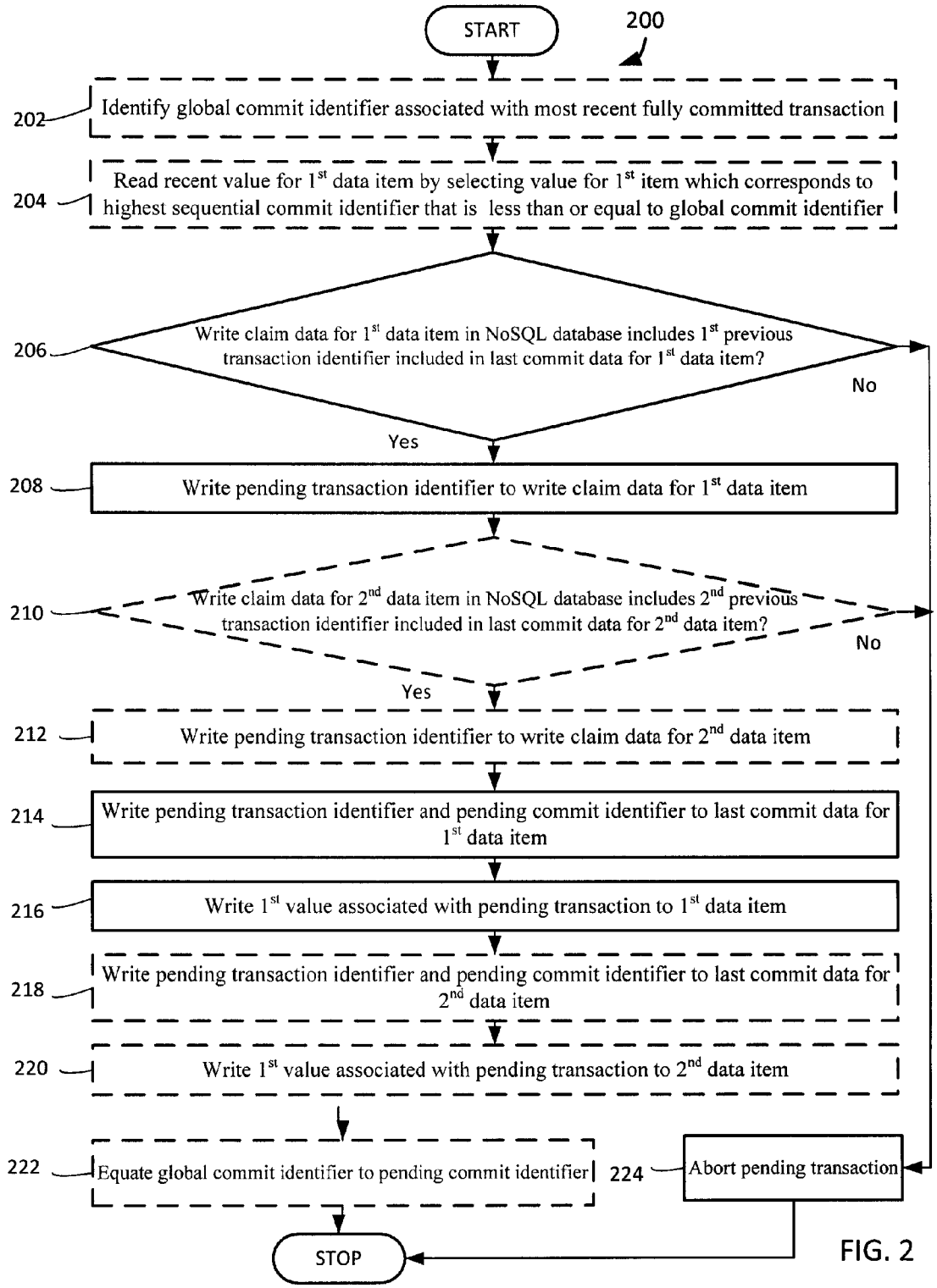
FIG. 2 is an operational flow diagram illustrating a high level overview of a method for atomic transactions in a NoSQL database in an embodiment.

FIG. 2 is an operational flow diagram illustrating a high level overview of a method 200 for atomic transactions in a NoSQL database. As shown in FIG. 2, a database system can provide atomic transactions in a NoSQL database. The method 200 uses a portion of an example data table 100 that is described above in reference to FIG. 1 and a portion of an example data table 300 that is described below in reference to FIG. 3.

In block 202, a global commit identifier associated with a most recent fully committed transaction is optionally identified. For example and without limitation, this can include the database system processing a new transaction identified by the transaction identifier 124, described below in reference to FIG. 3. The database system identifies the global commit identifier 113 associated with most recent fully committed transaction, which is stored outside of table 100 in a specific global commit identifier storage. Identifying the global commit identifier enables a read transaction to correctly identify consistent values, based on a specific point in time, for any set of data items.

In block 204, a recent value is optionally read for a first data item by selecting a value for the first data item which corresponds to a highest sequential commit identifier that is less than or equal to a global commit identifier. By way of example and without limitation, this can include the database system processing the new transaction identified by the transaction identifier 124 by reading the most recent value for the data item 101, to which the new transaction is to write. The most recent value is read for an operation that uses the most recent value to create a new value, such as using an existing bank balance to create a new bank balance based on the existing bank balance and a new operation that affects the existing bank balance. The database system reads the most recent value for the data item 101 by selecting the value of $1,850 for the joint checking account balance which corresponds to the highest sequential commit identifier 113 that is less than or equal to the global commit identifier 113. This reading of data values may be for any number of data items—as many as the transactions read before the database system starts to commit transactions.

In another example, the database system processes the new transaction identified by the transaction identifier 124 by reading the most recent value for the data item 102 by selecting the value of June 20 for the payment date which corresponds to the highest sequential commit identifier 112 that is less than or equal to the global commit identifier 113, because the $1,000 deposit made by the commit identified by the commit identifier 113 did not result in writing any data to the data item 102.

In yet another example, even if the database system identifies a new value of "Water Bill" written by a commit identified by commit identifier 115, described below in reference to FIG. 3, the database system would still read a recent value for the data item 103 by selecting the value of "Credit Card" for the payee which corresponds to the highest sequential commit identifier 112 that is less than or equal to global commit identifier 113. The database system reads the value corresponding to the commit identifier 112 because the commit identifier 115 is greater than the global write commit identifier of 113, which indicates that the commit corresponding to the commit identifier 115 occurred after the database system began reading the data items for the new transaction identified by the transaction identifier 124.

The database system thereby provided the new transaction identified by the transaction identifier 124 with a consistent view of data that existed at a specific point in time rather than attempting to read any values written by a transaction that began after the beginning of the new transaction identified by the transaction identifier 124. The database system only attempts to read past or present values for a pending transaction, and not what are considered to be future values from the perspective of the pending transaction. Therefore, a user who initiated a transaction sees the database values as they were when the user's transactions began, and does not see any changes which subsequently occurred to the database due to any other transactions until after the user's transaction completes.

In block 206, a determination is made whether write claim data for a first data item in a NoSQL database includes a first previous transaction identifier included in last commit data for the first data item. In embodiments, this can include the database system processing the new transaction identified by the transaction identifier 124 by determining whether the write claim data for a joint checking account balance includes the previous transaction identifier 123 that is included in the last commit data for the joint checking account balance. If the database system determines that the write claim data for the first data item includes the first previous transaction identifier included in the last commit data for the first data item, then the method 200 continues to block 208 to continue processing for the pending transaction. Alternatively, if the database system determines that the write claim data for the first data item does not include the first previous transaction identifier included in the last commit data for the first data item, then the method 200 proceeds to block 224 to abort the pending transaction.

The determination in block 206 eliminates the problem of using stale data by verifying whether any other transaction has established a claim to write a value to the data item after the database system read the value of the data item for a pending transaction. The database system verifies whether any other transaction has established a claim to write a value to the data item by reading the write claim data for the data item and determining if another transaction other than the transaction identified by the global transaction identifier has written its transaction identifier to the write claim data for the data item. If no other transaction has established a claim to write to a data item, the database system writes a transaction identifier for the pending transaction to the write claim data for the data item. Writing the transaction identifier for the pending transaction to the write claim data for the data items establishes the pending transaction's claim to write a value to the data item. The database system repeats this process for each data item to which the pending transaction is to write. If the database system is able to establish the claim to write to every data item to which the pending transaction is to write, the pending transaction may be able to complete an atomic write. However, if the database system is unable to establish the claim to write to any of the data items to which the pending transaction is to write because the write claim data for any of the data items stores a transaction identifier other than a transaction identifier that is less than or equal to the global transaction identifier, then the database system aborts the pending transaction because the pending transaction cannot complete an atomic write. Establishing a claim to write establishes a transaction's claim to write to one data item, and if a transaction can establish a claim to write for all data items, the transaction may be able to complete an atomic write.

In block 208, a pending transaction identifier is written to write claim data for a first data item in response to a determination that the write claim data for the first data item includes a first previous transaction identifier included in last commit data for the first data item. For example and without limitation, this can include the database system processing the new transaction identified by the transaction identifier 124 by writing the pending transaction identifier 124 to the write claim data for the joint checking account balance because the write claim data for the joint checking account balance includes the previous transaction identifier 123 that is included in the last commit data for the joint checking account balance. In this example, the database system is able to establish a claim to write to a data item to which the pending transaction is to write.

In block 210, a determination is optionally made whether write claim data for a second data item in a NoSQL database includes a second previous transaction identifier included in last commit data for the second data item. By way of example and without limitation, this can include the database system determining whether the write claim data for the data item 103 for a payee includes the previous transaction identifier 122 that is included in the last commit data for the data item 103 for the payee. If the database system determines that the write claim data for the second data item includes the second previous transaction identifier included in the last commit data for the second data item, then the method 200 continues to block 212 to continue processing for the pending transaction. Alternatively, if the database system determines that the write claim data for the second data item does not include the second previous transaction identifier included in the last commit data for the second data item, then the method 200 proceeds to block 224 to abort the pending transaction.

Block 210 applies to the second data item, whereas block 206 applies to the first data item, as the database system must check the write claim data for each data item to which the pending transaction is to write to insure an atomic transaction. The determination in block 210 eliminates the problem of using stale data by verifying whether any other transaction has established a claim to write a value to the data item after the database system read the value of the data item for the pending transaction. The database system verifies whether any other transaction has established a claim to write a value to the data item by reading the write claim data for the data item and determining if another transaction other than the transaction identified by the global transaction identifier has written its transaction identifier to the write claim data for the data item. If no other transaction has established a claim to write to a data item, the database system writes a transaction identifier for the pending transaction to the write claim data for the data item. Writing the transaction identifier for the pending transaction to the write claim data for the data items establishes the pending transaction's claim to write a value to the data item. The database system repeats this process for each data item to which the pending transaction is to write. If the database system is able to establish the claim to write to every data item to which the pending transaction is to write, the pending transaction may be able to complete an atomic write. However, if the database system in unable to establish the claim to write to any of the data items to which the pending transaction is to write, then the database system aborts the pending transaction because the pending transaction cannot complete an atomic write.

In block 212, a pending transaction identifier is optionally written to write claim data for a second data item in response to a determination that the write claim data for the second data item includes a second previous transaction identifier included in last commit data for the second data item. In embodiments, this can include the database system writing the pending transaction identifier 124 to the write claim data for the data item 103 for the payee because the write claim data for the data item 103 for the payee includes the previous transaction identifier 122 that is included in the last commit data for the data item 103 for the payee. In this example, the database system is able to establish a claim to write to another data item to which the pending transaction is to write. Although method 200 is a simplified example of two determinations of whether another transaction has a claim to write to two corresponding data items and establishing the claims to write to the data items, the method 200 may include any number of determinations for any number of corresponding data items and establishing any number of claims to write to the data items. The method 200 continues to block 214 only if the database system can establish claims to write to all of a pending transaction's data items. If the database system cannot establish claims to write to all of the pending transaction's data items, then the database system aborts the pending transaction.

In block 214, a pending transaction identifier and a pending commit identifier are written to last commit data for a first data item. For example and without limitation, this can include the database system generating a pending commit identifier 114, described below if reference to FIG. 3, for the pending transaction, and then writing the pending transaction identifier 124 and the pending commit identifier 114 to the last commit data for the joint checking account balance. The database system records the necessary identifiers in the last commit data for a data item that is about to be overwritten with a new value, thereby enabling subsequent transactions to repeat the process of method 200 and identify the new value written to the data item.

In block 216, a first value associated with a pending transaction is written to a first data item. By way of example and without limitation, this can include the database system writing the value $1,700 to the joint checking account balance based on the previous balance of $1,850 and a new electronic payment of $150 for the electric bill, information which had been stored in a write log for the pending transaction. A simplified example of data stored in such a write log may be: data item 101=$1750, data item 102=July 10, data item 103=electric bill.

In block 218, a pending transaction identifier and a pending commit identifier are written to last commit data for a second data item. In embodiments, this can include the database system writing the pending transaction identifier 124 and the pending commit identifier 114 to the last commit data for the data item 103 for the payee. The database system records the necessary identifiers in the last commit data for a data item that is about to be overwritten with a new value, thereby enabling subsequent transactions to repeat the process of method 200 and identify the new value written to the data item.

In block 220, a second value associated with a pending transaction is written to a second data item. For example and without limitation, this can include the database system writing the value "Electric Bill" to the data item 103 for the payee, information which had been stored in the write log for the pending transaction.

In block 222, a global commit identifier is optionally equated to a pending commit identifier. By way of example and without limitation, this can include the database system equating the global commit identifier to the pending commit identifier 114, and then the method 200 stops. The database system records the pending transaction's commit identifier as the updated global commit identifier in the specific global commit identifier storage, thereby enabling subsequent transactions to repeat the process of method 200 and identify any new values written to the corresponding data items. The database system has written the transaction values atomically to the corresponding data items, even though the data items are stored in a NoSQL database. At this point the pending transaction has finished. Assuming that global commit identifiers increase, the global commit identifier is the highest numbered pending transaction identifier for which all lower numbered transactions have finished. For example, given transaction identifiers 1, 2, 3, and 4, where transactions 1, 2, and 4 have finished, the global commit identifier is 2 until transaction 3 finishes, in which case the global commit identifiers becomes 4.

In block 224, a pending transaction is aborted in response to a determination that write claim data for a data item does not include a first previous transaction identifier included in last commit data for the data item. In embodiments, this can include the database system aborting the transaction associated with the pending transaction identifier 124 if either the write claim data for the joint checking account balance does not include the previous transaction identifier 123 or the data item 103 for the payee does not include the previous transaction 122, which is included in the last commit data for the joint checking account balance or the data item 103 for the payee. If the database system cannot establish claims to write to all of the pending transaction's data items, then the database system aborts the pending transaction, and uses the write log for the pending transaction to roll back the transaction identifiers in the write claim data for the pending transaction's data items. The database system uses the write log to identify the pending transaction's data items, and then writes the previous transaction identifiers in the write claim data for the pending transaction's data items. The database system may retrieve the previous transaction identifiers from the last commit data for the pending transaction's data items.

The method 200 may be repeated as desired. Although this disclosure describes the blocks 202-224 executing in a particular order, the blocks 202-224 may be executed in a different order. In other implementations, each of the blocks 202-224 may also be executed in combination with other blocks and/or some blocks may be divided into a different set of blocks. Accordingly, systems and methods are provided which enable a database system to provide atomic transactions in a NoSQL database.

Figure 3:
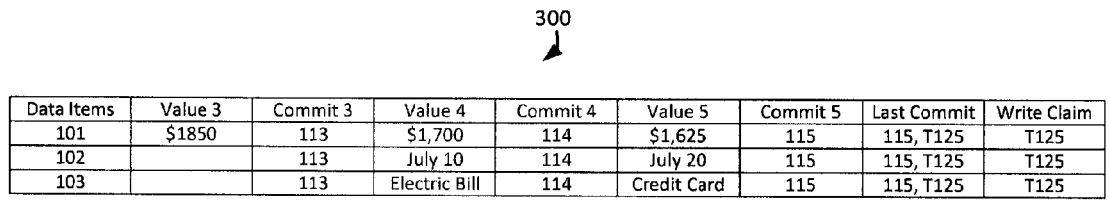
FIG. 3 is a screen shot illustrating a portion of another example data table for atomic transactions in a NoSQL database in an embodiment.

FIG. 3 is a screen shot illustrating a portion of an example data table 300 for atomic transactions in a NoSQL database in an embodiment. The examples above in reference to the method 200 describe the database system establishing a new claim to write to each of the data items 101, 102, and 103, generating the commit identifier 114, and writing the value $1,700 to the data item 101 for the joint checking account balance and writing the value "Electric Bill" to the data item 103 for the payee. When the wife's mobile phone initiates the transaction identified by the transaction identifier T124, the husband's tablet computer may concurrently initiate a transaction identified by the transaction identifier T125 to pay $75 electronically to a credit card account on July $20^{th}$. Following the process described above in the method 200, the database system may respond to the transaction identified by the transaction identifier T125 by establishing a new claim to write to each of the data items 101, 102, and 103, generating the commit identifier 115, and writing the value $1,625 to the data item 101 for the joint checking account balance and the value "Credit Card" to the data item 103 for the payee.

The method 200 enables the database system to avoid using stale data and to process the transactions T 124 and T125 atomically and concurrently. If two concurrent transactions attempt to write to the same data item, the transactions will not deadlock, which is a problem for pessimistic concurrency control, because either one transaction can succeed before the database system aborts the other transaction or the database system may abort both transactions before either transaction succeeds.

Additionally, the database system may flush values that are unlikely to be read again, thereby providing additional storage capacity. For example, if the database system is limited to storing only three values for each of the data items 101, 102, and 103, the database system may purge the values associated with the commit identifiers 111 and 112 because none of these values is the most current value for any of the data items 101, 102, or 103, as depicted in FIG. 3. Furthermore, each transaction may hold its new values locally so that only the holding transaction may interact with the new values.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for atomic transactions in a NoSQL database, the apparatus comprising:
   a processor; and
   one or more stored sequences of instructions which, when executed by the processor, cause the processor to implement the steps of:
   determining whether write claim data for a first data item in a non-relational database includes a first previous transaction identifier, the write claim data storing a transaction identifier for a transaction that establishes a claim to write a value to the first data item, the first previous transaction identifier being included in last commit data for the first data item;

updating the write claim data for the first data item to include a pending transaction identifier in response to a determination that the write claim data for the first data item includes the first previous transaction identifier;

updating the last commit data for the first data item with the pending transaction identifier and a pending commit identifier in response to the determination that the write claim data for the first data item includes the first previous transaction identifier;

writing a first value associated with a pending transaction to the first data item; and aborting the pending transaction in response to a determination that the write claim data for the first data item does not include the first previous transaction identifier included in the last commit data for the first data item.

2. The apparatus of claim 1, further comprising the steps of:

determining whether write claim data for a second data item includes a second previous transaction identifier included in last commit data for the second data item;

writing the pending transaction identifier to the write claim data for the second data item in response to a determination that the write claim data for the second data item includes the second previous transaction identifier included in the last commit data for the second data item;

writing the pending transaction identifier and the pending commit identifier to the last commit data for the second data item;

writing a second value associated with the pending transaction to the second data item; and aborting the pending transaction in response to a determination that the write claim data for the second data item does not include the second previous transaction identifier included in the last commit data for the second data item.

3. The apparatus of claim 2, wherein aborting the pending transaction in response to the determination that the write claim data for the second data item does not include the second previous transaction identifier included in the last commit data for the second data item comprises writing the previous transaction identifier to the write claim data for the first data item.

4. The apparatus of claim 1, further comprising the steps of:

identifying a global commit identifier associated with a most recent fully committed transaction; and reading a recent value for the first data item by selecting a value for the first data item which corresponds to a highest sequential commit identifier that is either less than or equal to the global commit identifier.

5. The apparatus of claim 4, further comprising the step of equating the global commit identifier to the pending commit identifier.

6. A computer program product, comprising a non-transitory computer-readable medium having a computer-readable program code embodied therein to be executed by one or more processors, the program code including instructions to:

determine whether write claim data for a first data item in a non-relational database includes a first previous transaction identifier, the write claim data storing a transaction identifier for a transaction that establishes a claim to write a value to the first data item, the first previous transaction identifier being included in last commit data for the first data item;

update the write claim data for the first data item to include a pending transaction identifier in response to a determination that the write claim data for the first data item includes the first previous transaction identifier;

update the last commit data for the first data item with the pending transaction identifier and a pending commit identifier in response to the determination that the write claim data for the first data item includes the first previous transaction identifier;

write a first value associated with a pending transaction to the first data item; and abort the pending transaction in response to a determination that the write claim data for the first data item does not include the first previous transaction identifier included in the last commit data for the first data item.

7. The computer program product of claim 6, wherein the program code includes further instructions to:

determine whether write claim data for a second data item includes a second previous transaction identifier included in last commit data for the second data item;

write the pending transaction identifier to the write claim data for the second data item in response to a determination that the write claim data for the second data item includes the second previous transaction identifier included in the last commit data for the second data item;

write the pending transaction identifier and the pending commit identifier to the last commit data for the second data item;

write a second value associated with the pending transaction to the second data item; and abort the pending transaction in response to a determination that the write claim data for the second data item does not include the second previous transaction identifier included in the last commit data for the second data item.

8. The computer program product of claim 7, wherein aborting the pending transaction in response to the determination that the write claim data for the second data item does not include the second previous transaction identifier included in the last commit data for the second data item comprises writing the previous transaction identifier to the write claim data for the first data item.

9. The computer program product of claim 6, wherein the program code includes further instructions to:

identify a global commit identifier associated with a most recent fully committed transaction; and read a recent value for the first data item by selecting a value for the first data item which corresponds to a highest sequential commit identifier that is either less than or equal to the global commit identifier.

10. The computer program product of claim 9, wherein the program code includes further instructions to equate the global commit identifier to the pending commit identifier.

11. A method for atomic transactions in a NoSQL database, the method comprising:

determining whether write claim data for a first data item in a non-relational database includes a first previous transaction identifier, the write claim data storing a transaction identifier for a transaction that establishes a claim to write a value to the first data item, the first previous transaction identifier being included in last commit data for the first data item;

updating the write claim data for the first data item to include a pending transaction identifier in response to a determination that the write claim data for the first data item includes the first previous transaction identifier;

updating the last commit data for the first data item with the pending transaction identifier and a pending commit identifier in response to the determination that the write claim data for the first data item includes the first previous transaction identifier;

writing a first value associated with a pending transaction to the first data item; and aborting the pending transaction in response to a determination that the write claim data for the first data item does not include the first previous transaction identifier included in the last commit data for the first data item.

12. The method of claim 11, the method further comprising:

determining whether write claim data for a second data item includes a second previous transaction identifier included in last commit data for the second data item;

writing the pending transaction identifier to the write claim data for the second data item in response to a determination that the write claim data for the second data item includes the second previous transaction identifier included in the last commit data for the second data item;

writing the pending transaction identifier and the pending commit identifier to the last commit data for the second data item;

writing a second value associated with the pending transaction to the second data item; and aborting the pending transaction in response to a determination that the write claim data for the second data item does not include the second previous transaction identifier included in the last commit data for the second data item.

13. The method of claim 12, wherein aborting the pending transaction in response to the determination that the write claim data for the second data item does not include the second previous transaction identifier included in the last commit data for the second data item comprises writing the previous transaction identifier to the write claim data for the first data item.

14. The method of claim 11, the method further comprising:

identifying a global commit identifier associated with a most recent fully committed transaction; and reading a recent value for a first data item by selecting a value for the first data item which corresponds to a highest sequential commit identifier that is either less than or equal to the global commit identifier.

15. The method of claim 14, the method further comprising equating the global commit identifier to the pending commit identifier.

16. A method for transmitting code for atomic transactions in a NoSQL database, the method comprising:

transmitting code to determine whether write claim data for a first data item in a non-relational database includes a first previous transaction identifier, the write claim data storing a transaction identifier for a transaction that establishes a claim to write a value to the first data item, the first previous transaction identifier being included in last commit data for the first data item;

in response to a determination that the write claim data for the first data item includes the first previous transaction identifier, transmitting code to update the write claim data for the first data item to include a pending transaction identifier;

transmitting code to update the last commit data for the first data item with the pending transaction identifier and a pending commit identifier, and;

transmitting code to write a first value associated with a pending transaction to the first data item; and transmitting code to abort the pending transaction in response to a determination that the write claim data for the first data item does not include the first previous transaction identifier included in the last commit data for the first data item.

17. The method for transmitting code of claim 16, the method further comprising:

transmitting code to determine whether write claim data for a second data item includes a second previous transaction identifier included in last commit data for the second data item;

transmitting code to write the pending transaction identifier to the write claim data for the second data item in response to a determination that the write claim data for the second data item includes the second previous transaction identifier included in the last commit data for the second data item;

transmitting code to write the pending transaction identifier and the pending commit identifier to the last commit data for the second data item;

transmitting code to write a second value associated with the pending transaction to the second data item; and transmitting code to abort the pending transaction in response to a determination that the write claim data for the second data item does not include the second previous transaction identifier included in the last commit data for the second data item.

18. The method for transmitting code of claim 17, wherein transmitting code to abort the pending transaction in response to the determination that the write claim data for the second data item does not include the second previous transaction identifier included in the last commit data for the second data item comprises transmitting code to write the previous transaction identifier to the write claim data for the first data item.

19. The method for transmitting code of claim 16, the method further comprising:

transmitting code to identify a global commit identifier associated with a most recent fully committed transaction; and transmitting code to read a recent value for the first data item by selecting a value for the first data item which corresponds to a highest sequential commit identifier that is either less than or equal to the global commit identifier.

20. The method for transmitting code of claim 19, the method further comprising transmitting code to equate the global commit identifier to the pending commit identifier.

* * * * *